United States Patent Office 3,268,609
Patented August 23, 1966

3,268,609
HYDROCARBON CONVERSION PROCESS
William G. Nixon, Clearwater, Fla., assignor to Universal Oil Products Company, Des Plaines, Ill., a corporation of Delaware
No Drawing. Filed Aug. 6, 1965, Ser. No. 477,963
16 Claims. (Cl. 260—668)

This application is a continuation-in-part of my copending application Serial No. 379,721, filed July 1, 1964, which is a continuation-in-part of my application Serial No. 270,514, filed April 4, 1963, now abandoned, which is a continuation-in-part of my application Serial No. 166,-421, filed January 15, 1962, now abandoned, which is a continuation-in-part of my application Serial No. 55,852, filed September 14, 1960, now abandoned.

This invention relates to a conversion process for the conversion of isomerizable organic compounds and more particularly to a conversion process for converting isomerizable unsaturated organic compounds into more useful compounds. More specifically, this invention is concerned with a conversion process for the isomerization of an isomerizable unsaturated hydrocarbon utilizing a novel high surface area catalytic composition of matter.

In recent years with the advances in the automotive industry, fuels of relatively high octane ratings have been found necessary. Many methods have been provided for the production of high anti-knock fuels. These methods include such processes as alkylation, catalytic reforming, catalytic cracking, and high temperature thermal cracking and reforming operations. Other processes which may be considered in one sense auxiliary were developed such as isomerization which was employed to produce isoparaffins which subsequently were reacted with olefins to form a high octane number motor fuel fraction, commonly termed alkylate. In addition to the production of one of the reactants for alkylation, isomerization was also utilized to increase the anti-knock quality of saturated hydrocarbons such as paraffins and naphthenes found in selected fractions of gasolines and naphthas. An example of the latter type of operation is a process in which pentane and/or hexane fractions are isomerized to produce isopentanes and/or isomeric hexanes, respectively, which subsequently may be employed as blending stocks for automotive and aviation fuels.

In most of the above-mentioned isomerization processes, catalytic agents are employed to effect the desired molecular rearrangement. Ordinarily, these catalytic agents consist of metal halides, such as aluminum chloride, aluminum bromide, etc., which are activated by the addition of the corresponding hydrogen halide. These catalytic agents are very active and effect high conversion per pass of such compounds as normal butane. However, the activity of these catalysts is so high that the catalysts accelerate decomposition reactions as well as isomerization reactions with the result that the ultimate yield of isomerized product is reduced. This is particularly true as the molecular weight of the isomerizable compound increases through a homologous series, such as in going from normal butane through normal pentane and normal hexane to normal heptane. This cracking also considerably increases catalyst consumption by reaction of fragmental materials with the catalytic agent to form sludge-like material. In spite of what might have been predicted, these decomposition and/or cracking reactions cannot be reduced by simply lowering the reaction zone severity, for example, by reducing temperature or by increasing liquid hourly space velocity. At temperatures and space velocities at which satisfactory isomerization reactions are obtained, these reactions are pronounced. In some prior art processes, low surface area (about 100 square meters per gram or less) sulfate-containing refractory oxide catalysts have been used with a limited degree of success, but yields of isomerized product are so low as to make the process economically unattractive. It has also been suggested in the prior art that it is sometimes desirable to promote various sulfate-containing catalysts with metals such as platinum and palladium and metal oxides of Group VIII of the Periodic Table. However, these catalysts usually require the presence of hydrogen to keep the catalytic surface of the catalyst clean. Other prior art processes suggest the utilization of liquid phase concentrated acid or acid mixture catalysts without the use of any catalyst support. These catalysts are often difficult to work with and often require special handling facilities as well as special equipment to resist the corrosive nature of the catalyst. In addition, since the acid catalyst is usually maintained in such a process as a liquid, certain temperature and pressure limitations are inherently present in such a system and processing flexibility of adjusting the process to meet the demand for a specific product is hence greatly curtailed. It is therefore apparent to one skilled in the art that a solid catalytic composite possesses processing and handling qualities that a liquid phase acid catalyst can never have.

I have discovered a high surface area catalyst which can be effectively employed in isomerization reactions in which, for example, the double bond of an olefinic hydrocarbon may be shifted to a more centralized position in the chain or the carbon skeleton arrangement of the compound may undergo rearrangement.

It is therefore an object of this invention to provide a process for the isomerization of isomerizable organic compounds utilizing a novel high surface area isomerization catalyst.

A specific object of this invention is to provide a novel method and a novel high surface area catalyst for isomerizing isomerizable unsaturated organic compounds to provide the desired isomerized product in high yields without the inducing of other decomposition reactions.

One embodiment of the invention is found in a conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of high surface area alumina selected from the group consisting of gamma-alumina, eta-alumina and theta-alumina.

A specific embodiment of the invention resides in a conversion process which comprises isomerizing 1-butene at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and the sulfites of Groups VI–B and VIII of the Periodic Table chemically bonded to a substantially anhydrous high surface area alumina support selected from the group consisting of gamma-alumina, eta-alumina and theta-alumina.

Still another specific embodiment of the present invention resides in a conversion process which comprises isomerizing ethylbenzene at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of high surface area alumina selected from the group consisting of gamma-alumina, eta-alumina and theta-alumina.

Other objects and embodiments referring to alternative isomerizable unsaturated hydrocarbons and to alternative catalytic compositions of matter will be found in the following further detailed description of the invention.

The process of my invention is applicable to the isomerization of isomerizable unsaturated hydrocarbons including isomerizable olefinic hydrocarbons and isomerizable alkyl aromatic hydrocarbons. For example, the process of my invention is applicable to the isomerization of olefins, for example, the isomerization of 1-butene to 2-butene, the isomerization of 3-methyl-1-butene to 2-methyl-2-butene. Also, the process of this invention can be utilized to shift the double bond of an olefinic hydrocarbon such as 1-pentene, 1-hexene, 2-hexene and 4-methyl-1-pentene to a more centrally located position so that 2-pentene, 2-hexene, 3-hexene and 4-methyl-2-pentene, respectively, can be obtained. It is not intended to limit this invention to those enumerated olefins set out above as it is contemplated that shifting of the double bond to a more centrally located position may be effected in straight or branched chain olefinic hydrocarbons containing up to about 20 carbon atoms per molecule according to the process of the present invention.

In addition, as stated hereinabove, the process of the present invention may also be utilized for the isomerization of alkyl aromatic hydrocarbons, for example, the isomerization of ethylbenzene to dimethylbenzene or xylene, the isomerization of propylbenzene to methylethylbenzene or trimethylbenzene. Further, other alkyl aromatic hydrocarbons can be made to undergo a carbon skeleton rearrangement utilizing the process of this invention. Such suitable alkyl aromatic hydrocarbons for use in the present invention thus include ortho-xylene, meta-xylene, para-xylene, ortho-ethyltoluene, meta-ethyltoluene, para-ethyltoluene, 1,2,3-trimethylbenzene, 1,2,4-trimethylbenzene, 1,3,5-trimethylbenzene, normal propylbenzene, isopropylbenzene, and mixtures thereof, as well as higher molecular weight alkyl aromatic hydrocarbons such as hexylbenzene, nonylbenzene, dodecylbenzene, pentadecylbenzene, hexyltoluene, nonyltoluene, dodecyltoluene, pentadecyltoluene, etc. and mixtures thereof.

As set forth hereinabove, the process of my invention is applicable to the isomerization of unsaturated hydrocarbons. Furthermore, these unsaturated hydrocarbons may be derived as selective fractions from various naturally occurring petroleum streams. For example, they may be separated as individual components or, as certain boiling range fractions by selective fractionation and distillation of catalytically cracked gas oil. Thus, the process of this invention may be successfully applied to and utilized for complete conversion of isomerizable unsaturated hydrocarbons when these isomerizable unsaturated hydrocarbons are present in minor quantities in various gas streams. Thus, the isomerizable unsaturated hydrocarbon for use in the process of this invention need not be concentrated. For example, isomerizable unsaturated hydrocarbons appear in minor quantities in various refinery gas streams, usually diluted with gases such as hydrogen, nitrogen, methane, ethane, propane, etc. These refinery streams containing minor quantities of isomerizable unsaturated hydrocarbons are obtained in petroleum refineries from various refinery installations including thermal cracking units, catalytic cracking units, thermal reforming units, coking units, polymerization units, dehydrogenation units, etc. Such refinery off streams have in the past often been burned for fuel value, since an economical process for the utilization of their hydrocarbon content has not been available. This is particularly true for refinery gas streams known as off-gas streams containing relatively minor quantities of isomerizable unsaturated hydrocarbons.

As hereinbefore set forth, the invention is concerned with a conversion process for the isomerization of isomerizable organic compounds and more particularly for the isomerization of isomerizable unsaturated hydrocarbons, said process being effected in the presence of a high surface area catalyst which possesses a high degree of hydrocarbon conversion activity and is particularly effective as an isomerization catalyst for the isomerizable unsaturated organic compounds hereinabove set forth. The catalyst comprises an oxide of sulfur composited on and chemically bonded to a substantially anhydrous refractory oxide support comprising a major portion of high surface area alumina. However, not every refractory oxide support can be utilized as a satisfactory one for disposal of an oxide of sulfur thereon. The particular refractory oxide support which is to be utilized should possess a relatively high surface area and be substantially anhydrous or relatively free of water. By the term "substantially anhydrous or free of water" is meant less than 2.8 weight percent (of the particular solid support utilized) water present in said solid support after precalcination as hereinafter described. In most cases this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required for the dehydration will vary depending upon the support, and in addition, will depend upon whether the water is in a combined or in merely a physically adsorbed form. As hereinbefore set forth, the support is characterized by having a high surface area. By the term high surface area is meant the surface area of the support measured by surface adsorption techniques within the range of from about 25 to about 500 or more square meters per gram and particularly a support having a surface area greater than 100 square meters per gram. For example, it has been found that certain low surface area supports such as alpha-alumina which is obviously free from combined water and which has been freed from adsorbed water is not a satisfactory support for the oxides of sulfur in the preparation of catalysts for use in the process of this invention. Alpha-alumina is usually characterized by a surface area ranging from about 10 to about 25 square meters per gram. In contrast, gamma-alumina which has a surface area ranging from greater than about 100 square meters per gram to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline aluminum modifications such as gamma-, eta- and theta-alumina, although these are not necessarily of equivalent suitability. However, as is obvious from the above discussion, the limitation on the use of any particular support is one of freedom from combined or adsorbed water in combination with the high surface area of the support selected. In addition to the aforementioned high surface area gamma-, eta- and theta-aluminas which may be utilized as solid supports, it is also contemplated that other refractory oxides may be combined with said high surface area aluminas such as silica, magnesia, silica-magnesia, thoria, zirconia, etc., so long as the refractory oxide support comprises a major portion of the high surface area alumina.

Oxides of sulfur which are composited on and chemically combined with the high surface area solid supports hereinabove set forth include metallic oxides of sulfur in which the metallic portion of the compound preferably comprises a metal of Group VI–B of the Periodic Table, a metal of the Iron Group of Group VIII, as well as aluminum, etc., such as aluminum sulfate, nickel sulfate, nickel sulfite, chromium sulfate, chromium sulfite, molybdenum sulfate, tungsten sulfate, cobalt sulfate, cobaltous sulfite, ferric sulfate, ferric sulfite, etc. In addition to the hereinabove enumerated metallic oxides of sulfur it is also contemplated within the scope of this invention that the support may be impregnated with a solution of ammonium sulfate or ammonium sulfite, or, if so desired, with a solution of dilute sulfuric or dilute sulfurous acid followed by the addition of a sufficient amount of ammonium hydroxide to render the composite alkaline in nature. Following the impregnation, the support is then calcined thereby driving off the ammonia and allowing the oxide of sulfur to remain impregnated on and chemically bonded to the refractory oxide support. The evolution of the ammonia is thought to be due to the reaction of the oxide of sulfur with residual hydroxyl groups on the high surface area refractory oxide support, the major portion of which is a high surface area alumina. Regardless of whether or not this is so, the catalyst comprises an oxide of sulfur chemically combined on the surface thereof, and as hereinbefore set forth, it is the particular association of these components which results in the unusual catalytic properties of this high surface area catalyst.

The addition of the oxide of sulfur to the refractory oxide support which comprises a major portion of high surface area alumina will enhance the surface-area characteristics of the support. Surface-area characteristics are defined as the surface area, expressed as square meters per gram; pore volume, expressed as cubic centimeters per gram; and pore diameter expressed in angstrom units (A.). As hereinbefore set forth, certain forms of alumina which possess the desired high surface area characteristics are utilized either as the major component or as the refractory oxide support itself for the catalyst of this invention. The base alumina may be prepared by any of the well known suitable means of manufacture, one example of which is the addition of an alkaline reagent to a salt of aluminum in an amount sufficient to form aluminum hydroxide, which, upon drying and calcining, is converted to a high surface area alumina. Similarly, if the refractory oxide support comprises both a major portion of high surface area alumina and a minor portion of, for example, silica, these components may be prepared by separate, successive or coprecipitate means.

The catalyst which is utilized in the process of the present invention may be prepared by many methods. For example, a high surface area refractory oxide base previously prepared by the methods hereinbefore set forth is then combined with an oxide of sulfur by conventional means such as treating the base with a solution of said oxide of sulfur, said oxide of sulfur being added in an amount sufficient to allow the finished catalyst to contain from about 0.5 to about 15% or more by weight of sulfate or sulfite. Following this, the combined material is then dried by air oxidation in a furnace tube or muffle furnace, etc. The finished catalyst comprising the oxide of sulfur composited on and chemically combined with the high surface area refractory oxide support comprising a major portion of high surface area alumina is then utilized as the conversion catalyst, and especially an isomerization catalyst in the usual manner.

The process of this invention utilizing the high surface area catalyst hereinbefore set forth may be effected in any suitable manner and may comprise either a batch or continuous type operation. The preferred method by which the process of this invention may be effected is a continuous type operation. One particular method is the fixed bed operation in which the isomerizable unsaturated organic compound is continuously charged to a reaction zone containing a fixed bed of the desired high surface area catalyst, said zone being maintained at the proper operating conditions of temperature and pressure, that is, a temperature in the range of from about 0° to about 400° C. or more, and a pressure including a pressure of from about the atmospheric to about 200 atmospheres or more. The catalyst is suitable for either gas phase or liquid phase reactions so that the liquid hourly space velocity (the volume of charge per volue of catalyst per hour) may be maintained in the reaction zone in the range of from about 0.1 to about 20 or more, and preferably in a range of from about 0.1 to about 10, or at a gaseous hourly space velocity in a range of from about 100 to about 1500 or more. The reaction zone may comprise an unpacked vessel or coil or may be lined with an adsorbent packing material. The charge passes through the catalyst bed in either an upward or downward flow and the isomerized product is continuously withdrawn, separated from the reactor effluent, and recovered, while any unreacted starting materials may be recycled to form a portion of the feed stock. It is also contemplated within the scope of this invention that reaction gases such as hydrogen, nitrogen, argon, oxygen, air, etc., may also be charged to the reaction zone if desired. Another continuous type operation comprises the moving bed type in which the isomerizable unsaturated organic compound and the catalyst bed move either concurrently or countercurrently to each other while passing through said reaction zone. Yet another continuous type of operation which may be used is the slurry type in which the high surface area catalyst may be carried into the reaction zone as a slurry in the isomerizable unsaturated organic compound.

Still another type of operation which may be used is the batch type operation in which a quantity of the isomerizable unsaturated organic compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means such as, for example, by washing, drying, fractional distillation, crystallization, etc.

It is also contemplated within the scope of this invention that the high surface area catalyst of the present invention may be utilized for promoting miscellaneous organic reactions, said high surface area catalyst being employed in essentially the same way as when used for isomerizing isomerizable unsaturated organic compounds. Typical cases of reactions in which the present type of high surface area catalyst may be used include the polymerization of olefinic hydrocarbons such as the butylenes, etc.; the alkylation of cyclic compounds with olefins, the cyclic compounds including aromatics, polycyclic compounds, naphthenes, and phenols; condensation reactions such as those occuring between ethers and aromatics, alcohols and aromatics, phenols and aldehydes, etc.; reactions involving the hydrohalogenation of unsaturated organic compounds; ester formation by the interaction of carboxylic acids and olefins; and the like. The specific procedures for utilizing the present type of catalyst in miscellaneous organic reactions will be determined by the chemical and physical characteristics and the phase of the reacting constituents.

The following examples are given to illustrate the process of the present invention which, however, are not intended to limit the generally broad scope of the present invention in strict accordance therewith.

*Example I*

In this example, about 150 grams of 110° C. dried extruded high surface area alumina was placed in a furnace tube and treated with dry air at 600 cc. per minute while increasing temperature to 500° C. The furnace was maintained at about 500° C. for a period of 3 hours while the air oxidizing was continued. At this temperature, the system was then treated for 0.5 hour with a mixture of sulfur dioxide gas and air that had been passed through a separate furnace containing a platinum-containing compound that was maintained at elevated temperature to convert the $SO_2$ to $SO_3$. The system was then treated with 800 cc. of air per minute for 2 hours at 500° C. and then cooled to room temperature. A sample was carefully withdrawn, and this sample was designated as catalyst "A."

Catalyst "A" was analyzed and it was determined that catalyst "A," which contained the chemically combined oxide of sulfur, had a surface area of 300 m.$^2$/gram, a pore volume of 0.219 cm.$^3$/gram, a pore diameter of 29 A. and was substantially anhydrous. Catalyst "A" was white in color.

*Example II*

An 80% alumina-20% zirconia high surface area catalyst support in pill form is prepared and composited with a 20% solution of aluminum sulfate. The composite is then treated in a furnace tube with a stream of air while being slowly heated to a temperature of about 500° C. The composite is maintained at this temperature for a period of about 0.5 hour. The finished catalyst is found to have a surface area in excess of 150 square meters per gram and contains about 10 weight percent sulfate. This catalyst is designated as catalyst "B."

*Example III*

Another catalyst was prepared by impregnating 50 grams of high surface area alumina spheres with 85 cc. of a solution containing 5 cc. of concentrated sulfuric acid which had been adjusted to a pH of 9.0 using ammonium hydroxide. Following this, the composite was then treated in a furnace tube with a stream of air while being slowly heated to a temperature of 500° C. The furnace was maintained at this temperature for a period of 2 hours while air oxidizing the composite using 800 cc. of air per minute. While increasing the temperature to 500° C., it was noted that ammonia gas was evolved from the catalyst thereby leaving an oxide of sulfur on the refractory oxide base. The catalyst was found to be substantially anhydrous. This catalyst was designated as catalyst "C."

*Example IV*

Yet another catalyst was prepared by impregnating 150 grams of high surface area alumina spheres with 230 cc. of a solution containing 8.3 cc. of concentrated sulfuric acid plus water and sufficient ammonium hydroxide to bring the pH of the impregnating solution to a value of 9.0. The resultant composite was dried to remove excess water and then slowly heated in a furnace tube to 500° C. The catalyst was maintained at this temperature for a period of 2 hours while passing a stream of air through the catalyst bed. Ammonia gas was evolved. After cooling to room temperature, analysis of the finished catalyst disclosed that it contained about 8.5 weight percent of sulfate (2.83 weight percent sulfur), had a surface area of 181 m.$^2$/gram and was substantially anhydrous. This catalyst was designated as catalyst "D."

*Example V*

In this example, 100 grams of granular high surface area alumina was impregnated with 85 cc. of an aqueous solution containing 3 cc. of concentrated sulfuric acid. The resultant composite was dried to remove the excess water following which it was placed in a furnace tube and air oxidized to a catalyst temperature of 500° C. using 800 cc. of air per minute. Analytical analyses of the finished catalyst indicated that said catalyst contained 0.89 weight percent of sulfur which is approximately 2.7 weight percent of sulfate and was substantially anhydrous. This catalyst was designated as catalyst "E."

*Example VI*

A catalyst similar to those set forth in the above examples is prepared by compositing a cobalt sulfate solution with a refractory oxide base comprising high surface area alumina spheres. The resulting composite is then placed in a muffle furnace or tube furnace and is slowly heated to a temperature of about 500° C.; upon reaching this temperature the catalyst is air oxidized for an additional period of about 1 hour.

*Example VII*

A catalyst similar to that described in Example I is prepared by admixing a 20% molybdenum sulfate solution with high surface area alumina spheres following which the resultant composite is treated in a manner similar to that set forth in the above examples, that is, by being placed in a furnace tube and air oxidized at a temperature of about 500° C. for a period of about 1 hour.

*Example VIII*

The high surface area catalyst designated as catalyst "A" prepared according to Example I above is utilized in an isomerization reaction, 50 grams of the finished catalyst being placed in an appropriate continuous isomerization apparatus. In the experiment, 1-buetene is charged to the isomerization zone. The reactor is maintained at about 1000 p.s.i.g. and 140° C. Substantial conversion of the 1-butene to cis- and trans-2-butene is obtained as is evidenced by gas-liquid chromatography.

*Example IX*

A second portion of the catalyst prepared according to Example I and designated as catalyst "A" is again utilized in an appropriate continuous isomerization apparatus. In the experiment, 50 grams of the finished catalyst is placed in the isomerization reaction zone and 1-pentene is charged to said reaction zone. The reactor is maintained at about 800 p.s.i.g. and about 180° C. Substantial conversion of the 1-pentene to 2-pentene is obtained as is evidenced by gas-liquid chromatography.

*Example X*

The catalyst prepared according to Example II and designated as catalyst "B" is utilized in an appropriate continuous isomerization apparatus to determine the isomerization activity of said catalyst. In the experiment, the finished catalyst is placed in the isomerization reaction zone and 1-hexene at about 1.0 LHSV is charged to said reaction zone. The reactor is maintained at about 800 p.s.i.g. and a temperature of about 155° C. Gas-liquid chromatographic analyses of the product stream indicate that substantial conversion occurs with the major product being 2-hexene.

*Example XI*

The catalyst prepared according to Example III and designated as catalyst "C" is utilized in an appropriate isomerization apparatus to determine the isomerization activity of said catalyst. In the experiment, 100 grams of the finished catalyst is placed in the isomerization reaction zone and 3-methyl-1-butene is charged thereto. The reactor is maintained at about 800 p.s.i.g. and about 180° C. Substantial conversion of the 3-methyl-1-butene to 2-methyl-2-butene is obtained as is evidenced by gas-liquid chromatography.

Example XII

The catalyst prepared according to Example IV and designated as catalyst "D" is utilized in the isomerization apparatus described in the previous example to determine the isomerization activity of said catalyst. In the experiment, 100 grams of the finished catalyst is placed in the isomerization reaction zone and ethylbenzene is charged thereto. The reactor is maintained at about 800 p.s.i.g. and about 200° C. Substantial conversion of the ethylbenzene to dimethylbenzene is obtained as is evidenced by gas-liquid chromatography.

Example XIII

The catalyst prepared according to Example V and designated as catalyst "E" is utilized in the isomerization apparatus to determine the isomerization activity of said catalyst. In this experiment, 100 grams of the finished catalyst is placed in the isomerization reaction zone and isopropylbenzene is charged to the reaction zone. The reactor is maintained at about 800 p.s.i.g. and 180° C. Substantial conversion of isopropylbenzene to trimethylbenzene is obtained as is evidenced by gas-liquid chromatography.

I claim as my invention:

1. A conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of high surface area alumina selected from the group consisting of gamma-alumina, eta-alumina and theta-alumina.

2. A conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous high surface area alumina support selected from the group consisting of gamma-alumina, eta-alumina and theta-alumina.

3. A conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing sulfur compound derived from sulfuric acid chemically bonded to a substantially anhydrous high surface area alumina support selected from the group consisting of gamma-alumina, eta-alumina and theta-alumina.

4. A conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing sulfur compound derived from cobalt sulfate chemically bonded to a substantially anhydrous high surface area alumina support selected from the group consisting of gamma-alumina, eta-alumina and theta-alumina.

5. A conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing sulfur compound derived from molybdenum sulfate chemically bonded to a substantially anhydrous high surface area alumina support selected from the group consisting of gamma-alumina, eta-alumina and theta-alumina.

6. The process of claim 1 further characterized in that said isomerizable unsaturated hydrocarbon is an isomerizable olefinic hydrocarbon.

7. The process of claim 1 further characterized in that said isomerizable hydrocarbon is an isomerizable alkyl aromatic hydrocarbon.

8. A conversion process which comprises isomerizing 1-butene at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of high surface area alumina selected from the group consisting of gamma-alumina, eta-alumina and theta-alumina.

9. A conversion process which comprises isomerizing 1-pentene at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of high surface area alumina selected from the group consisting of gamma-alumina, eta-alumina and theta-alumina.

10. A conversion process which comprises isomerizing 1-hexene at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of high surface area alumina selected from the group consisting of gamma-alumina, eta-alumina and theta-alumina.

11. A conversion process which comprises isomerizing 3-methyl-1-butene at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of high surface area alumina selected from the group consisting of gamma-alumina, eta-alumina and theta-alumina.

12. A conversion process which comprises isomerizing ethylbenzene at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of high surface area alumina selected from the group consisting of gamma-alumina, eta-alumina and theta-alumina.

13. A conversion process which comprises isomerizing isopropylbenzene at a temperature in the range of from about 0° to about 400° C. and at a pressure in the range of from about atmospheric to about 200 atmospheres in contact with a catalyst consisting essentially of an oxygen-containing sulfur compound selected from the group consisting of sulfuric acid, sulfurous acid, ammonium sulfate, ammonium sulfite, aluminum sulfate and the sulfates and sulfites of Groups VI–B and VIII of the Periodic Table chemically bonded to a substantially anhydrous refractory oxide support comprising a major portion of hgh surface area alumina selected from the group consisting of gamma-alumina, eta-alumina and theta-alumina.

14. A conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing compound derived from aluminum sulfate chemically bonded to a substantially anhydrous high surface area composite of silica and alumina selected from the group consisting of gamma-alumina, eta-alumina and theta-alumina.

15. A conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing compound derived from ammonium sulfate chemically bonded to a substantially anhydrous high surface area alumina support selected from the group consisting of gamma-alumina, eta-alumina and theta-alumina.

16. A conversion process which comprises isomerizing an isomerizable unsaturated hydrocarbon at a temperature in the range of from about 0° to about 400° C. and at a pressure in the range of from about atmospheric to about 200 atmospheres in contact with a catalyst consisting essentially of an oxygen-containing compound derived from cobalt sulfate chemically bonded to a substantially anhydrous high surface area composite of silica and alumina selected from the group consisting of gamma-alumina, eta-alumina and theta-alumina.

References Cited by the Examiner

UNITED STATES PATENTS

| | | | |
|---|---|---|---|
| 2,293,353 | 8/1942 | Maravec et al. | 260—683.15 |
| 2,355,868 | 8/1944 | Jean | 260—683.15 |
| 2,387,994 | 10/1945 | Hillyer | 260—683.2 |
| 2,423,612 | 7/1947 | Mulligan et al. | 260—683.2 |
| 2,434,634 | 1/1948 | Bates | 260—683.2 X |
| 2,794,842 | 6/1957 | Hogan et al. | 260—683.15 |

DELBERT E. GANTZ, *Primary Examiner.*

C. R. DAVIS, *Assistant Examiner.*